R. W. ASHLEY.
VEHICLE WHEEL RIM.
APPLICATION FILED JUNE 17, 1916.
1,224,830.
Patented May 1, 1917.
4 SHEETS—SHEET 2.
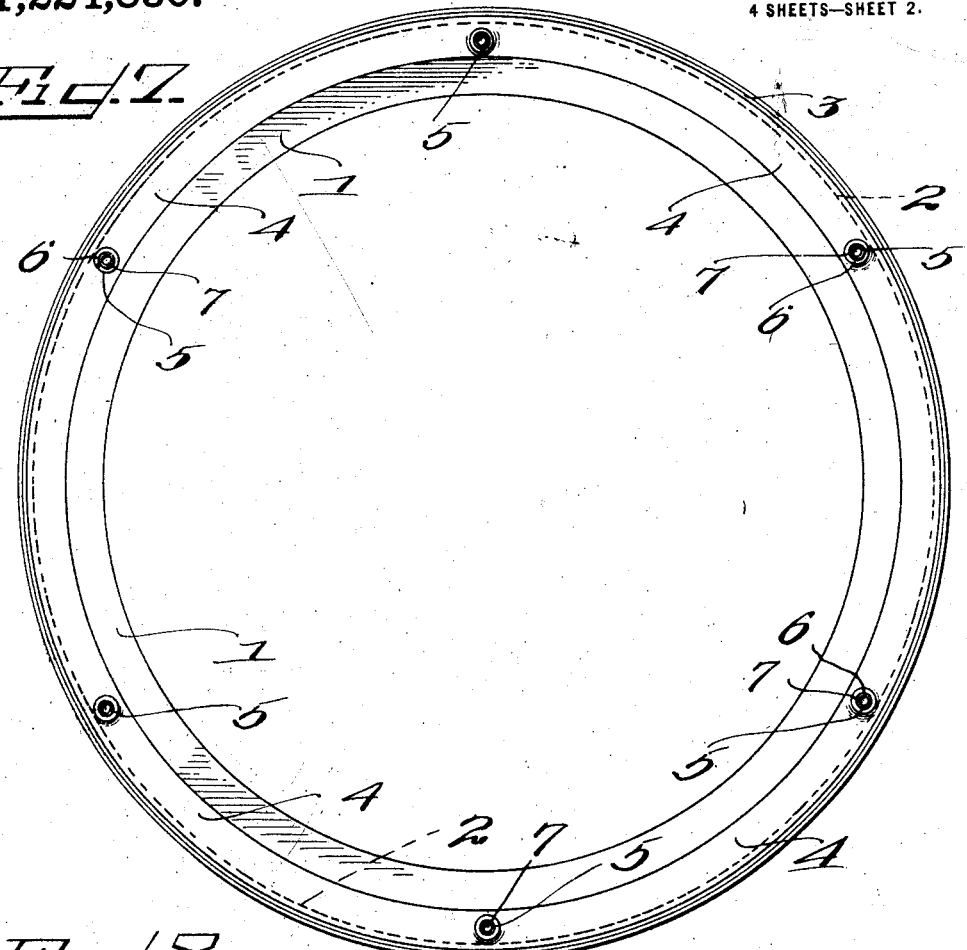
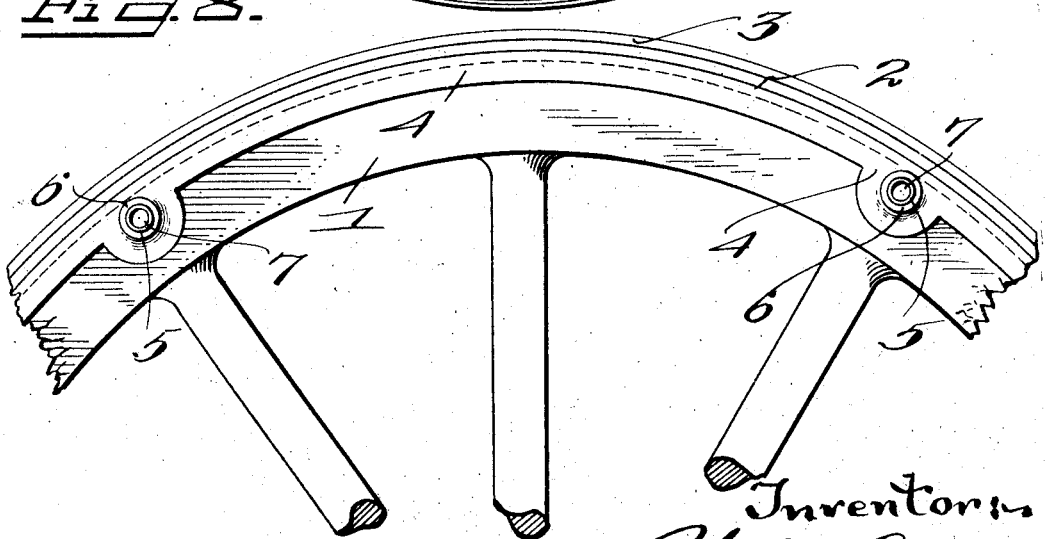
Inventor
Robert W. Ashley R. W. ASHLEY.
VEHICLE WHEEL RIM.
APPLICATION FILED JUNE 17, 1916.
1,224,830.
Patented May 1, 1917.
4 SHEETS—SHEET 3.
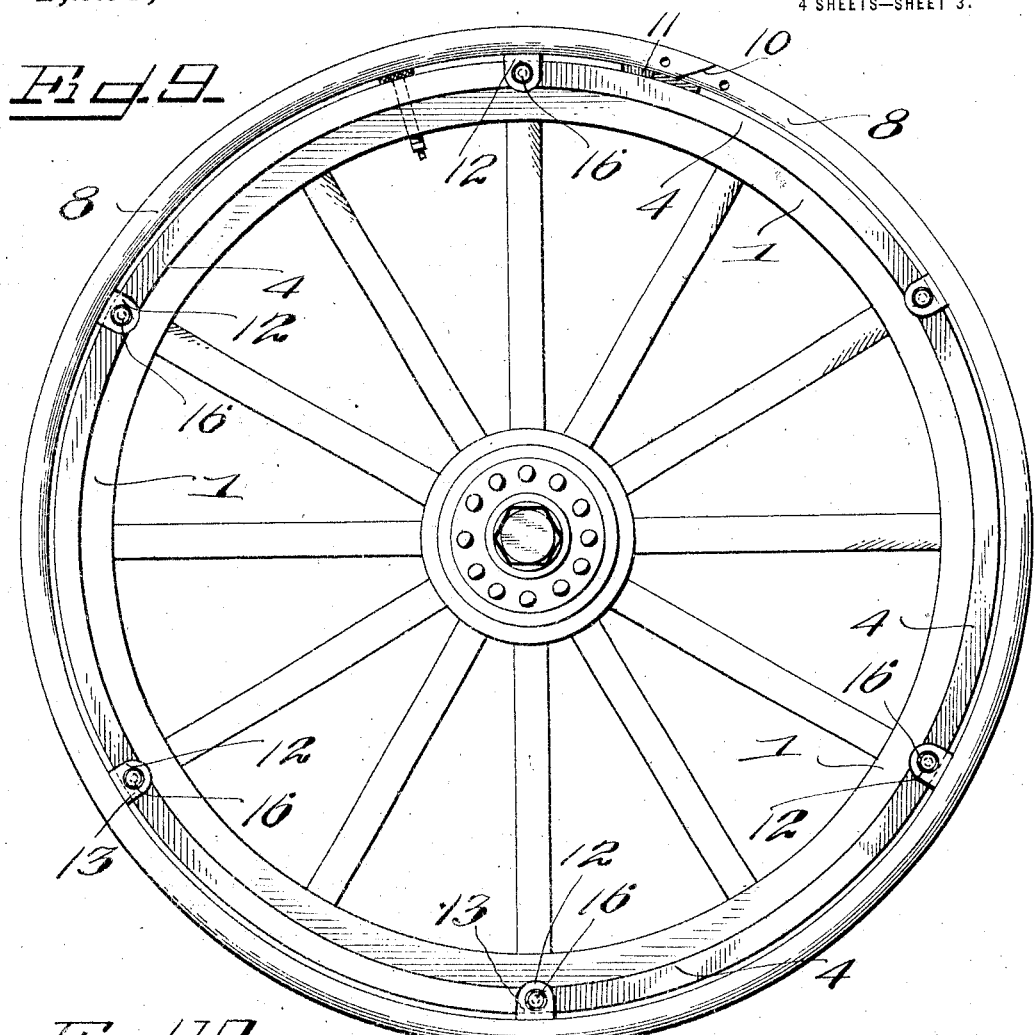
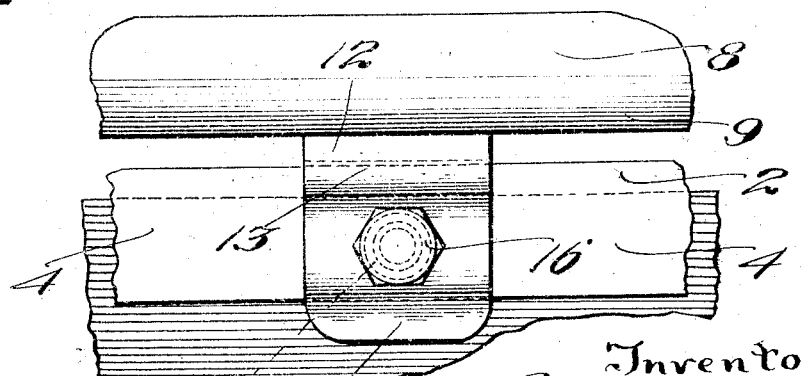

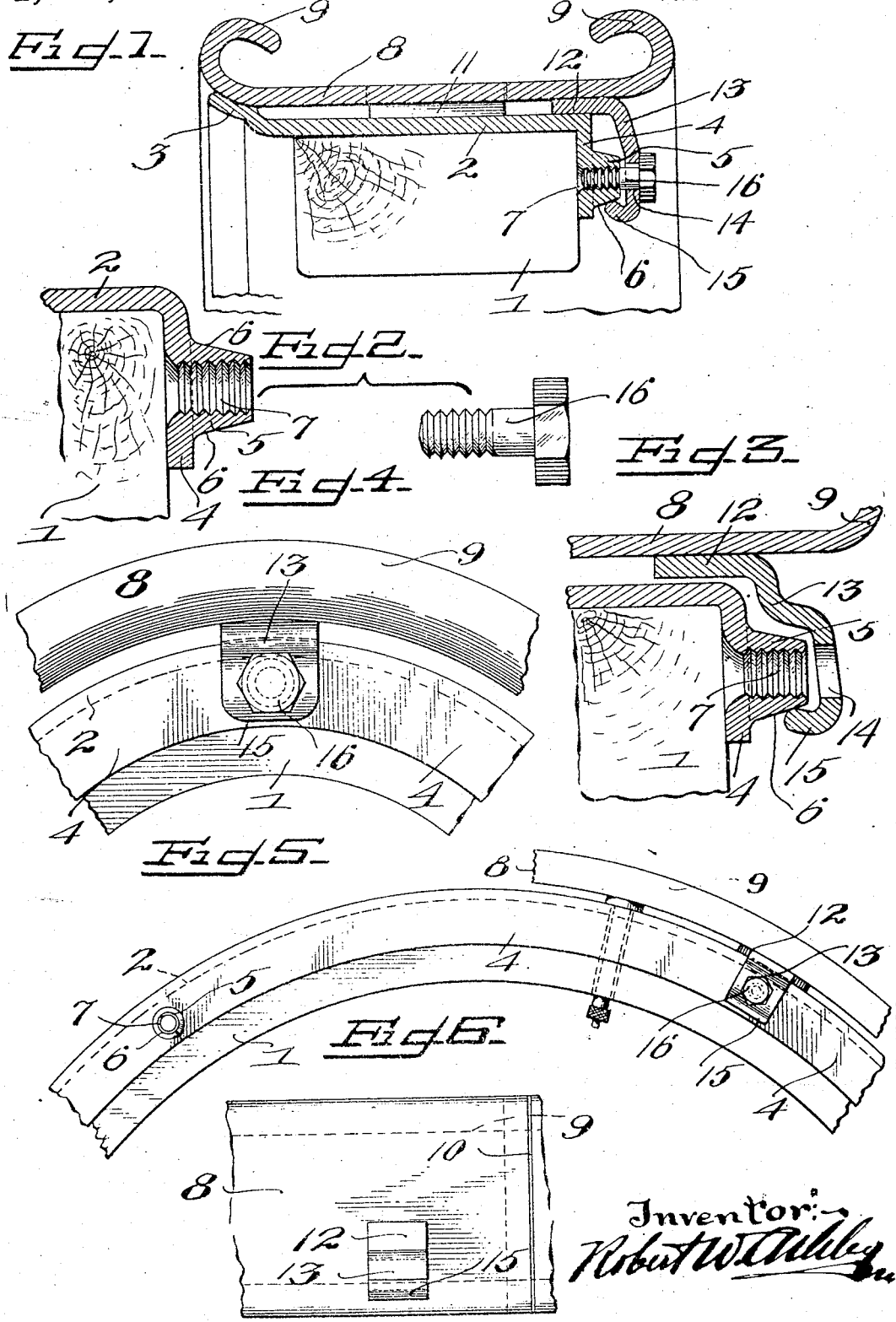

R. W. ASHLEY.
VEHICLE WHEEL RIM.
APPLICATION FILED JUNE 17, 1916.
1,224,830.
Patented May 1, 1917.
4 SHEETS—SHEET 4.
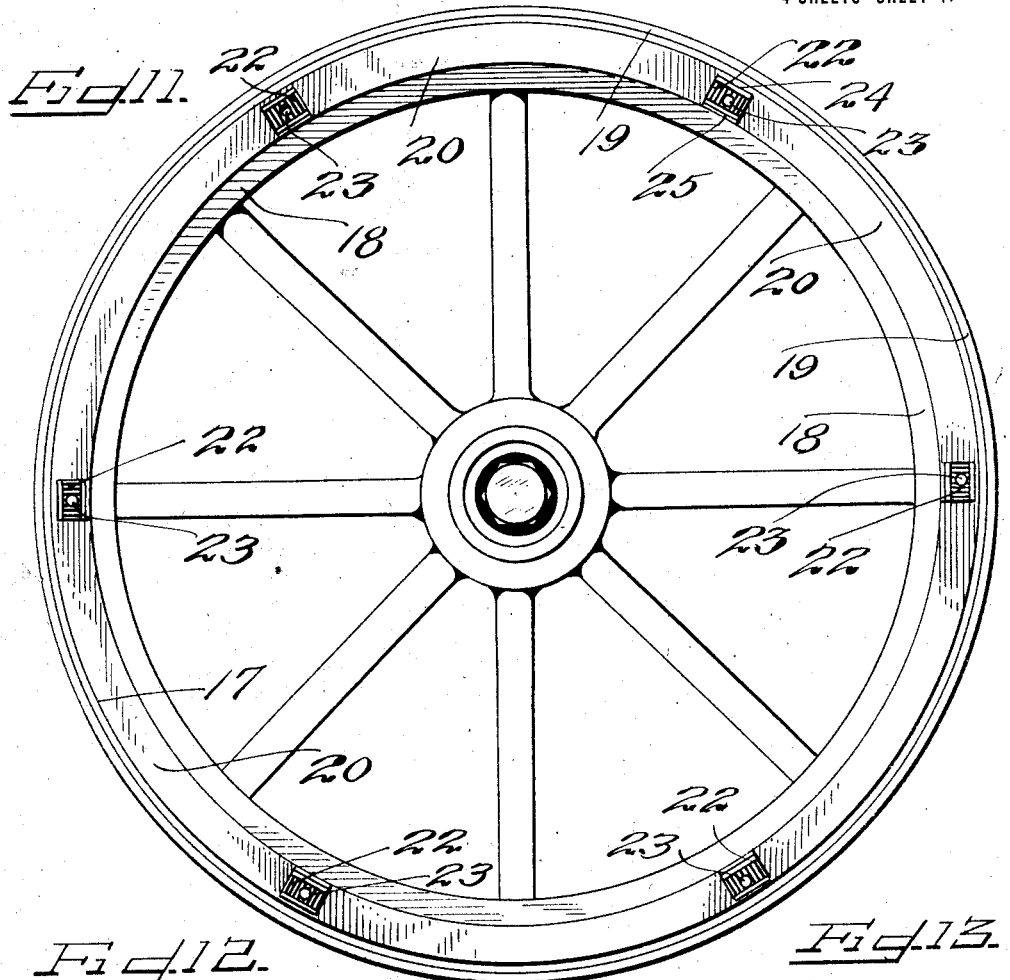
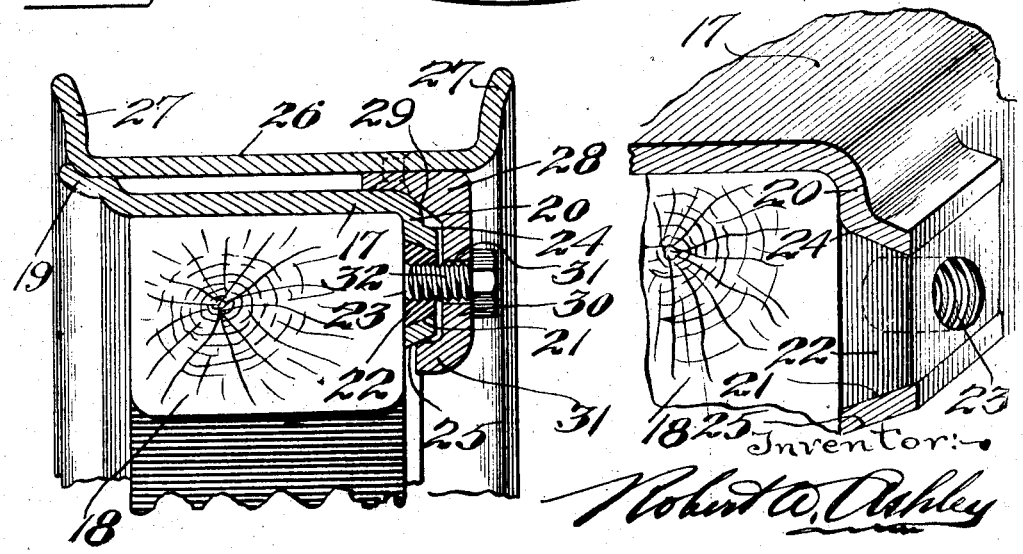

UNITED STATES PATENT OFFICE.

ROBERT W. ASHLEY, OF NEW YORK, N. Y., ASSIGNOR OF ONE-HALF TO FRANK OBERKIRCH, OF ST. MARYS, PENNSYLVANIA.

VEHICLE-WHEEL RIM.

1,224,830.   Specification of Letters Patent.   Patented May 1, 1917.

Application filed June 17, 1916. Serial No. 104,324.

*To all whom it may concern:*

Be it known that I, ROBERT W. ASHLEY, a citizen of the United States, residing at New York city, in the county of New York and State of New York, have invented new and useful Improvements in Vehicle-Wheel Rims, of which the following is a specification.

The invention relates to improvements in demountable rims for use in connection with motor vehicle wheels.

The object of the invention is the providing of a base rim or felly band provided at one edge with a depending reinforcing flange, having mounted therein or formed therein reception locking means, said felly band being arranged to receive a top or tire-carrying rim, having rigidly fastened thereto locking means adapted to engage the reception locking means on said felly band, and means arranged to engage the locking means and operative in said reception locking means adapted, when actuated, to exert upon the top or tire-carrying rim a contractive seating action annularly around said felly band.

A further object of the invention is the providing of a top or tire-carrying rim, wherein the locking means, which forms part thereof, acts as traction means to prevent the circumferential movement of the top rim on the felly band, each one of a series of said locking means acting not only as independent locking means, but independent contractive traction means.

In the following is described in connection with the accompanying drawings one embodiment of the invention, the features thereof being more particularly pointed out hereinafter in the claims.

In the drawings Figure 1 is a cross-sectional view of a felly band or base rim, having mounted thereon the clencher type of top rim carrying the contractive locking and traction means; Fig. 2 is a detailed cross-sectional view of the felly band illustrating one form of reception locking aperture and the locking bolt or set screw for locking the top rim thereto; Fig. 3 is a detailed cross-sectional view of the felly band and top rim at a point adjacent the locking means thereof, showing the initial or primary position of the relative rim parts before the locking bolt is applied thereto; Fig. 4 is a detailed side elevation of the base rim and top rim, showing the position of same when locked at one of the points of locking; Fig. 5 is a detailed side elevation of the top rim, showing the relative position thereof at one of the locking points adjacent the valve stem carried by a tire forming part of a pneumatic wheel structure. Fig. 6 is a detailed view of the under side of the top rim showing the relative position of the traction cleat or locking means thereon; Fig. 7 is a face elevation of a wood felly band having applied thereto a base rim having punched in the depending flange thereof a series of bosses adapted to receive and engage the locking cleats on a top rim showing the relative position of the apertures in said bosses for receiving the locking bolt; Fig. 8 is a detailed side elevation of a modified form of felly band illustrating an added means of cutting away the depending flange in order to leave depending faces at points adjacent the reception locking means; Fig. 9 is a side elevation of a wheel illustrating the position thereon of the felly band and the split form of top or tire-carrying rim. Fig. 10 is a detailed side elevation of a top rim illustrating the relative position of same with relation to the felly band at the point of locking the top rim to said felly band by the traction locking cleat; Fig. 11 is a detailed side elevation of a vehicle wheel having mounted thereon a demountable rim base or felly band provided with a depending flange having punched therein apertures, and having mounted in said apertures, by means of inserting them from the rear, a series of hardened steel nuts provided with apertures adapted to receive the locking clips carried by a top or tire-carrying rim. Fig. 12 is a cross-sectional view of the structure shown in Fig. 11 illustrating the relative position thereon of the top or tire-carrying rim and with the relative locking positions of the said annular bodies, and Fig. 13 is a detailed perspective view of the base rim parts being shown in cross-sectional view at a point adjacent the punched aperture in the depending flange thereof showing, with relation thereto, the hardened steel nut insert and with the relative position, in said view, of the aperture to receive the locking bolt, the walls of the depending flange being tapered both at the top and bottom to receive the locking cleats on the top or tire-carrying rim.

Similar numerals of reference indicate similar parts throughout the several views.

In the drawings (1) designates a wood felly, having mounted thereon a felly band (2) provided at its rear edge with a seating reception shoulder (3) and at its front edge with a depending flange (4) having punched therein at regular intervals in its annular surface a series of bosses (5) provided with tapered reception surfaces (6) and an internally threaded aperture (7).

(8) indicates a top or tire-carrying rim provided at its edges with tire reception beads (9) of the clencher type and may be an integral rim or it may be a rim split transversely thereof at one point thereof as at (10) and provided with suitable locking means beneath said split as at (11). Said top rim (8) has rigidly mounted in its under surface, by means of spot welds or rivets, traction locking cleats (12) provided with outwardly depending faces (13) having cut therein an aperture (14) and having formed on their lower edges hooks (15). (16) indicates the standard form of locking bolt or set screw (16) arranged to pass through aperture (14) in cleats 12 and to engage the internally threaded aperture (7) in boss (5). By turning the bolt (16) in aperture (7) and by reason of the engagement of the standard hexagonal head of the bolt (16) and by further reason of the engagement of the tapered surface (6) by hook (15), the action of same, when tightened, will cause the top or tire-carrying rim (8) to contact inwardly at each respective point of locking around its annular surface, thereby seating the top rim (8) on the seating shoulder (3) at the rear edge thereof and upon the under faces of locking cleats (12) at the front edge of the base rim or felly band.

Heretofore other types of rims have seated symmetrically at only one edge of the rim and usually that edge was the rear edge of the rim, but in this type of structure the actual forced and lock seating of the top rim is on the front edge of the felly band or at a point where such engagement and locking is absolutely necessary in order to prevent squeaking, and both lateral movement and annular or circumferential movement of the top rim on the felly band.

In Fig. 11 of the drawings the felly band (17) is mounted in any suitable manner on wooden felly (18) and has formed therein at its rear edge a seating shoulder (19) and at its front edge a depending flange (20) punched out as at (21) and leaving inclined surfaces, into which is inserted a hardened steel nut (22) provided with the threaded aperture (23) adapted to receive a suitable set screw or locking bolt. By punching the body of flange (20) out in the manner as shown and described, tapered edges (24) at the top and (25) at the bottom are provided, which receive the locking traction cleats. Top or tire-carrying rim (26) has formed thereon at both edges thereof tire beads (27) and has integrally or rigidly fastened thereto at its front edge locking traction cleats (28) provided with an abutment in surface (29) arranged to engage the edge of felly band (17) and a depending face portion (30) provided at its lower end with a hook (31) arranged for engagement with the beveled surface (25) of depending flange (20). Cleats (28) have formed therein apertures (31) through which pass threaded locking bolts or set screws (32) the threaded ends of which engage the internally threaded aperture (23) in nuts (22). Nut (22) may be case hardened in order to prevent rupture and may be either inserted in the aperture caused by the punching of the flange (20) loosely or it may be welded therein as desired. The locking bolts (16) and (32) in both instances are of the standard type of threaded bolt with ordinary type of hexagonal head and in case of the loss of same may be readily replaced.

The structure as shown and described is one wherein the top or tire-carrying rims (8) and (26) form an actual part of the structure as a wheel since the annular bodies thereof are not separable from one another, owing to the fact that the top or tire-carrying rim actually carries the demountable rim locking traction means and therefore the structure as described must necessarily be read as a component part since either one of the annular bodies is not divisible from another, as if one were divided from the other, it would not form a complete structure, owing to the fact that the felly band is the locking reception means and further that the top or tire-carrying rim is both the locking-retaining means as well as the locking traction means.

Any type of top rim may be employed in connection with this structure, either a rim split transversely of its surface at a single point and locked at that point, or an integral top band may be employed as either one will work successfully on this type of compound rim structure.

It is obvious that the device as herein shown and described may be varied in many of its structural features, as well as with the parts specified as used, without departing from the general scope and spirit of the invention.

What I claim and desire to secure by Letters Patent of the United States is—

1. A device of the character described comprising a felly band provided at one edge with a seating shoulder and at its opposite edge with a depending flange having punched therein apertures adapted to receive locking reception means, the walls of said apertures being arranged as auxiliary locking reception means, said felly band being arranged to receive a tire-carrying rim, having integrally mounted on the under surface thereof at one edge a plurality of locking traction cleats provided with means engaging the walls of said apertures, said locking traction cleats being provided with means for engaging said reception locking surfaces on and adjacent said apertures and being also provided with abutment surfaces for engagement with said felly band, and means engaging said locking traction cleats and said first mentioned locking reception means for exerting upon said tire-carrying rim a contractive action to seat same annularly around the periphery of said felly band at both of the respective edges of said felly band.

2. A device of the character described comprising a felly band having formed at one edge a reception seating shoulder and at its front edge with a depending flange having punched therein apertures, reception locking nuts mounted in said apertures, tapered locking surfaces formed on the walls adjacent said apertures, said felly band being arranged to receive a top rim having rigidly mounted at its front edge on its under surface thereof a plurality of traction locking cleats provided at their lower ends with hooks engaging the tapered surface of the walls of said apertures and arranged with abutment surfaces engaging the edge of said felly band and having formed therein apertures, and a plurality of locking bolts mounted in said reception locking nuts and engaging said locking traction cleats adapted to exert upon said top rim when brought into engagement a contractive seating action to seat said top rim on said reception seating shoulder and upon the under surfaces of said plurality of locking traction cleats on the front peripheral edge of said felly band.

In witness whereof, I have hereunto signed my name in the presence of two subscribing witnesses.

ROBERT W. ASHLEY.

In the presence of—
   E. W. ASHLEY,
   C. S. ASHLEY.